Oct. 18, 1949.  R. G. QUINN ET AL  2,485,458

DIELECTRIC SHEET AND METHOD OF MANUFACTURE

Filed March 28, 1944

INVENTOR
ROBERT G. QUINN.
JOSEPH C. HARKNESS.
BY
ATTORNEY

Patented Oct. 18, 1949

2,485,458

UNITED STATES PATENT OFFICE 2,485,458

DIELECTRIC SHEET AND METHOD OF MANUFACTURE

Robert G. Quinn, Bound Brook, and Joseph C. Harkness, Manville, N. J., assignors to Johns-Manville Corporation, New York, N. Y., a corporation of New York Application March 28, 1944, Serial No. 528,490

8 Claims. (Cl. 92—21)

1

This invention relates to dielectric sheets, and is particularly concerned with an improved asbestos paper base dielectric sheet and method of manufacturing the same.

An object of the invention is to provide a dielectric sheet having sufficient flexibility, tensile strength and dielectric stability at high temperatures and in the presence of moisture, to adapt it as dielectric tape suitable for wrapping cables or other weather exposed electric conductors.

Dielectric sheets of suitable dielectric properties and temperature resistance for the indicated purpose can be made by employing asbestos paper as the base element. However, asbestos paper of the conventional type made of a water-laid felt of paper grade chrysotile asbestos fibers, requires binders to develop sufficient strength for use as cable wrapping or other related dielectric purposes. Starch, casein and sodium silicate have all been used as binders for asbestos paper. All of such binders, however, are susceptible to moisture, and affect adversely the dielectric properties and flexibility of papers containing the same. During the manufacture of asbestos paper on a paper machine, the fibers pack into a comparatively dense sheet of low porosity, and when one of the conventional binders is present, such papers shrink considerably on drying. The dried paper exhibits brittleness and low tear resistance; and attempts heretofore made to provide a dielectric sheet of suitable tensile strength which is flexible and substantially waterproof have been generally unsuccessful.

Another object is to provide a simple and economical method of manufacturing asbestos paper base dielectric sheets of suitable strength, flexibility and dielectric properties for the indicated purpose.

A more specific object is that of providing an asbestos paper of suitable wet and dry tensile strength and flexibility and having a porosity and structural composition such as to absorb and retain therein at temperatures as high as 350° F., asphalt or other thermoplastic waterproofing impregnant in amounts representing at least 50% of the weight of the paper.

With the above stated objects and features in view, the invention consists in the improved dielectric sheet and method of manufacture which is hereinafter described and more particularly defined by the accompanying claims.

Figure 1:
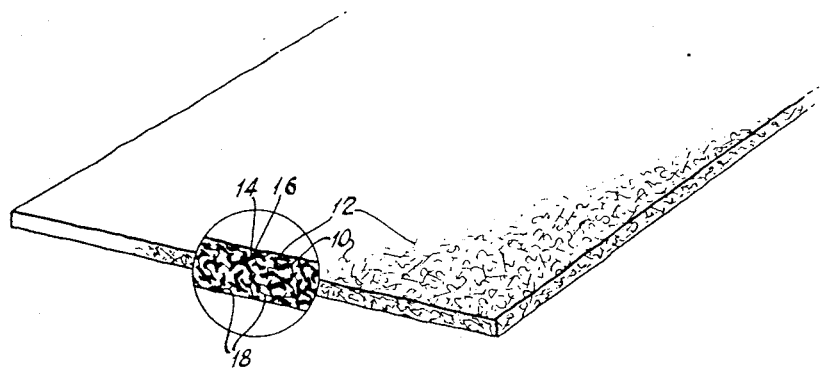
Figure 2:
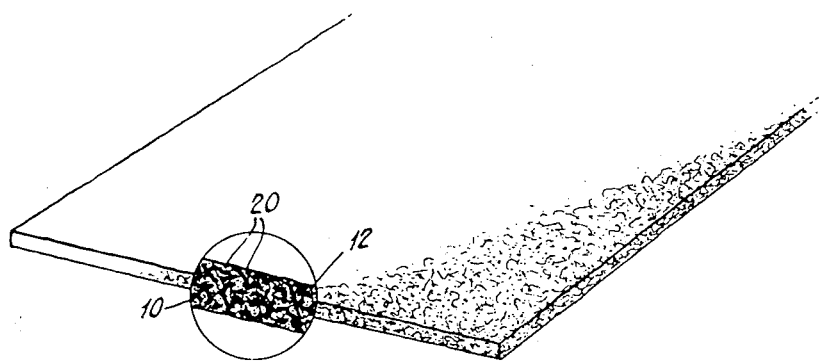

In the accompanying drawings:

Fig. 1 presents a highly magnified edge view superimposed on a diagrammatic perspective view of a sheet of asbestos paper having high absorptiveness for impregnants; and Fig. 2 shows diagrammatically in perspective the sheet of Fig. 1 after impregnation to form a complete dielectric sheet representing a preferred embodiment of our invention.

In order that the dielectric sheets of the present invention may possess both high flexibility and high dielectric strength and stability, they should have a thickness caliper within the range of 5–15 mils, and should exhibit substantial water impermeability and stability at temperatures at least as high as 350° F. Asbestos paper suitable as a base for such sheets must have a capillarity and composition suitable for absorbing and retaining at least 50% of the weight of the paper, and preferably 60–200% by weight, of a waterproofing impregnant such as a refined natural or blown asphalt. Smaller amounts of impregnant are insufficient to develop waterproofness or water impermeability and consequent dielectric stability in the final product. The conventional types of asbestos paper of the indicated thickness are too dense and will not absorb and retain asphalt in amounts substantially exceeding 20% of the weight of the paper.

The asbestos paper of the present invention possesses high absorptivity for asphalt impregnant as a result of incorporating in its structure a comparatively high proportion of harsh and straight non-paper grade fibers belonging to the group consisting of harsh chrysotile and tremolite fibers. In other words, the fiber furnish for the paper includes soft, flexible and curly paper grade chrysotile fibers and straight, harsh non-paper grade fibers in such proportions that the harsh and straight fibers represent 30–60% of the total fiber furnish.

To develop the necessary wet and dry tensile strength and volume stability (including non-shrinking characteristics) for the asbestos paper, without adversely affecting its absorptivity for impregnant, the binder component of the paper should be present in amounts not substantially exceeding 10% of the weight of the fibers in the furnish, and should impart suitable strength and flexibility while maintaining a high degree of capillary porosity in the paper structure. The binder should also exhibit heat and moisture resistance and chemical stability in close contact with asbestos fibers. Suitable binders are developed in the fiber furnish by incorporating in the fiber furnish aqueous dispersions of polyvinyl resins including polyvinyl chloride, acrylic ester resins and polychloroprene. A preferred binder material for use in the paper furnish is commercial polychloroprene latex, which is highly compatible with chrysotile and tremolite asbestos fibers and with bituminous impregnants. The polyvinyl resins referred to, and particularly polychloroprene, are coagulated by asbestos fibers, and can be deposited on the fibers from a dilute aqueous dispersion in the form of thin films of high adhesive strength. The adhesive attraction of polychloroprene particles for the fibers is such that the felting characteristics of the fibers are actually improved by the presence of the binder films, and the resulting wet felt exhibits unusually high binder and filler retention and drainage characteristics.

In manufacturing a paper the first step is that of preparing a suitable fiber furnish of soft chrysotile fibers and harsh straight chrysotile or tremolite fibers. The fibers should be refined and purified to a minimum content of coarse stubby pencils and to a low dust, rock and magnetite content. The fibers should be reduced prior to felting to a predominant fiber length passing standard 14 mesh screen and retained on standard 100 mesh screen. Since the dust, magnetite and other impurities are strongly adhered to the fibers by electrostatic charges, one of the principal steps in refining the fibers consists in forming an aqueous fibrous suspension of about 2% fiber concentration, and agitating the suspension after admixture therewith of about 2–3% by weight of the fibers of a chemical wetting and dispersing agent. After the impurity particles have been liberated from the fibers and dispersed in aqueous suspension, separation of the heavy magnetite and grit impurities from the fibers may be effected by agitation of the suspension in a differential density cone separator. Further purification and partial dewatering of the fibrous suspension may then be carried out in a knotter type rotary or Trommel screen separator. An aqueous suspension of the clean fibers of about 4% fiber concentration is delivered to a conventional fiber beater.

In the beater the fibers are further refined by prolonged brushing or stroking operations which are effective to defiberize or separate the bundles of fibers down to an average fineness not substantially exceeding .002 mm. average diameter, while at the same time reducing the average length of the fibers. After a refining treatment normally lasting 20–30 minutes in the beater, a polychloroprene latex of 15–50% polychloroprene concentration may be added to the fiber furnish in the beater in amount representing 5–10% by weight of solid polychloroprene based on the weight of the fibers in the furnish. The polychloroprene latex and fiber furnish is further agitated in the beater to develop a thin suspension in which the polychloroprene particles and fibers are uniformly dispersed into a pulp of about 2–4% solids content. The asbestos fibers carry a substantially electro-positive charge, and the polychloroprene particles in the latex suspension are negatively charged. Consequently, when the fibers and polychloroprene latex are mixed during the last stages of the beater cycle, the polychloroprene is coagulated and particles thereof are attracted to the surfaces of the individual asbestos fibers and build up thin adhesive coating films thereon. The finer the fibers the greater the surface area presented for deposition of the adhesive polychloroprene binder films. Nevertheless, only a relatively small proportion (under 10%) by weight of the polychloroprene, based on the fibers, is sufficient for developing a strong bond for a paper retaining sufficient absorptiveness for bituminous and resinous dielectric impregnants to meet the requirements of the present invention.

After completing that portion of the beater cycle in which the polychloroprene or other polyvinyl resin binder is dispersed throughout the fiber furnish and coagulated on the individual fiber surfaces, the felting properties of the furnish are still further improved by adding at this stage a suspension of purified bentonite clay in such proportions as to incorporate in the furnish approximately 5% by weight of bentonite based on the dry weight of asbestos fibers. The bentonite contributes a certain degree of heat stability to the binder component of the paper, and the bentonite functions also as an anti-tack filler which permits ready felting of the furnish and handling on conventional paper machines without any difficulties with screen clogging or the like. The presence of the bentonite at the binder-asphalt interfaces also improves the physical bond between the asphalt and the paper. The thoroughly beaten stock or pulp is conducted from the beater to a storage chest wherein agitation is continued, and by the time that it is discharged from the storage chest to the head box of a paper making machine the furnish should be still further diluted to a solids concentration of not to exceed 1%. This dilution may be effected by means of recycled "white water."

A suitable fiber-polychloroprene binder-bentonite furnish for manufacturing a base sheet of 10 mil thickness exhibited a Schopper-Riegler freeness of 350 cc., as compared to a Schopper-Riegler freeness of 180 cc. for a furnish having the same fiber and bentonite content but omitting the polychloroprene resin binder. The Schopper-Riegler freeness of a furnish for a 6 mil paper was increased from 220 cc. to 280 cc. by incorporating therein about 5% by weight of a polychloroprene resin binder. The operating speed of the paper machine can be substantially increased in producing a paper of the type herein described, because of the increase in drainage rate produced by the resin binder.

The fibers, bearing composite polychloroprene particle-bentonite films thereon, are deposited on the cylinders, screens or felts of the paper making machine according to normal paper making procedure, in a water-laid, felted wet web. After suitable calendering of the web between pressure rolls, the paper is finally dried to eliminate substantially all moisture, as a preliminary step to the final operation of impregnating the paper with a bituminous or resinous waterproofing dielectric.

The absorptive asbestos paper (Fig. 1) which forms the base of the dielectric sheet contains soft curly paper grade chrysotile fibers 10 and harsh, straight non-paper grade chrysotile or tremolite fibers 12 distributed uniformly in random lay throughout the sheet. The individual fibers are coated and bonded together by films 14 of polychloroprene or other suitable polyvinyl resin binder, and any inherent tackiness of the binder films is reduced by the presence of supplementary film coatings 16 of bentonite. The paper sheet retains a high degree of porosity and a high volume of capillary interstices 18 even after calendering by the press rolls and drying on the drier of a conventional paper machine. The capillarity of the dry paper is such that it will absorb and retain 60–100% of its weight of an asphalt impregnant 20 (Fig. 2) during an impregnation treatment in which the porous paper sheet is run through a bath of solvent reduced asphalt containing about 50% asphalt, and thereafter through a drier in which the solvent is removed by vaporization, and a set of calender rolls. The paper will absorb and retain 100-200% of its weight of asphalt when the impregnation treatment is carried out with a bath of molten asphalt unreduced by solvents.

The absorptive paper base of the dielectric sheets herein described has a bulk or volume about double that of conventional asbestos papers of the same weight. Despite its bulk and absorptive characteristics, the base paper exhibits good flexibility and dry tensile strength of at least 1500 lbs. per sq. inch. The preferred impregnant is an asphalt having a melting point of at least 130° F. and having a standard needle penetration under 100 gram load of .15 cm. in five seconds at 77° F. Other bituminous or thermoplastic resin impregnants may be substituted for the asphalt. After impregnation the sheet should be dried at a temperature high enough to eliminate any solvents. The asphalt or other impregnant should impart to the final dielectric sheet properties of substantial water impermeability, pliability and toughness without adversely affecting the dielectric properties. The fiber composition of the product is sufficiently high to impart non-flammability and temperature stability, and the binder components are so proportioned as to develop the necessary tensile and tear strength and felting properties. The finished dielectric sheet containing the asphalt or resin impregnant is sufficiently pliable and flexible to resist cracking when subjected to multiple folding. The sheet material retains its dielectric properties and physical strength in moist atmospheres. The resulting sheets are capable of withstanding exposure to temperatures of the order of 350° F. for long periods of time, without bleeding off impregnant, and without substantial loss of strength.

A dielectric sheet of 8 mil thickness and containing asphalt impregnant in amount representing 60% by weight of the base paper, when made as herein described, exhibited a dry tensile strength of 27-28 lbs. per inch of width, or 3500 lbs. per square inch. The heat resistance of the dry sheet was such that after aging for 24 hours at a temperature of 125° C., it suffered less than 1% loss in weight, and retained sufficient flexibility to withstand wrapping around a mandrel of ¼-⅜ inch diameter without developing cracks over a 96 hour aging period at 125° C. Such sheet absorbed less than 7% of its weight of water during immersion over a 72 hour period, and exhibited a gain in weight of not to exceed 2½% after exposure for 48 hours to an atmosphere of saturated steam. The same sheet had a dry dielectric strength of 438 v. per mil thickness, and a dielectric strength of 304 v. per mil thickness after standing 24 hours in an atmosphere of saturated steam.

The stability of the product apparently results at least in part from the development of strong bonds between the fibers and the chloroprene binder and bituminous or resin impregnant. Because of the method of deposition of the polychloroprene binder is a thin film at the surfaces of the individual fibers in the felted paper, the paper incorporates throughout its structure minute interstices into which the impregnant penetrates at least in part by capillary action, so that a strong physical bond is thereby developed between the impregnant and the binder coated fibers.

Since many variations may be made from the illustrative details given, without departing from the scope of the invention, it is intended that the invention should be limited only by the terms of the claims interpreted as broadly as consistent with novelty over the prior art.

What we claim is:

1. A tough and flexible porous sheet comprising a water-laid felt of soft paper grade chrysotile and non-paper grade asbestos fibers belonging to the group consisting of harsh chrysotile and tremolite, and a polyvinyl resin binder individually coating and bonding the fibers, said binder being present in amount representing 5-10% of the weight of the sheet, and said sheet containing 30-60% of its total fiber weight of harsh non-paper grade asbestos fibers.

2. A flexible porous sheet comprising, a water laid felt of soft, curly chrysotile and harsh, straight asbestos fibers belonging to the group consisting of harsh chrysotile and tremolite, less than 10% by weight of the fibers of a polychloroprene resin binder individually coating and bonding the fibers, and a small amount of bentonite clay adhering to the resin binder, said sheet incorporating 30-60% of its total fiber weight of the harsh, straight asbestos fibers.

3. A tough and flexible dielectric sheet including an asbestos paper base consisting of a water-laid felt of soft curly chrysotile fibers and straight, harsh fibers belonging to the group consisting of harsh chrysotile and tremolite asbestos, said felt being bonded with 5-10% of its weight of a polyvinyl resin binder, and said paper having its interstices substantially filled with a thermoplastic waterproofing impregnant in amount representing 60-200% of the weight of the base paper.

4. A waterproof, flexible dielectric sheet comprising, a felted mat of approximately equal proportions of soft chrysotile and harsh tremolite asbestos fibers, said fibers being individually coated and bonded together by polychloroprene resin in amount representing 5-10% of the fiber weight, and said sheet incorporating a pore sealing asphalt impregnant in amount representing at least 50% of the weight of the fibers.

5. In manufacturing asbestos paper the steps comprising, forming a dilute aqueous furnish containing soft, curly chrysotile asbestos fibers and straight, harsh fibers belonging to the group consisting of harsh chrysotile and tremolite, said furnish containing said harsh fibers in amount representing 30-60% of the total fiber weight, subjecting the fiber furnish to a defiberizing treatment in a beater cycle, adding to the furnish toward the end of the beater cycle a polyvinyl resin latex binder and agitating the fiber-binder furnish to coagulate the polyvinyl resin and to effect deposition thereof as coating films for the individual fibers, at a still later stage of the beater cycle adding bentonite clay to the furnish in amount approximating 5% by weight of the fibers, agitating the fiber-binder-clay furnish to develop binder-clay films coating the individual fibers, diluting the furnish with water to a consistency of less than 1% solids, and sheeting out the furnish and dewatering it to form a felted sheet.

6. In manufacturing flexible dielectric sheets, the steps comprising, forming an aqueous furnish of not more than 4% solids concentration containing clean, soft chrysotile fibers and straight, harsh tremolite fibers, said tremolite fibers being present in amount representing 30-60% of the total fiber furnish, subjecting the furnish to a defiberizing treatment in a beater cycle, adding to the furnish toward the end of the beater cycle a polychloroprene latex in amount proportioned to supply a polychloroprene binder representing 5-10% by weight of the fibers, agitating the fiber-binder furnish to coagulate the polychloroprene resin at the individual surfaces of the fibers, adding bentonite clay to the furnish in amount approximating 5% by weight of the fibers, diluting the furnish with water to a consistency of less than 1% solids, and sheeting out the furnish and dewatering it to form a felt.

7. In manufacturing strong and flexible dielectric sheets the steps comprising, forming a dilute aqueous furnish containing soft paper grade chrysotile asbestos fibers and harsh non-paper grade fibers belonging to the group consisting of harsh chrysotile and tremolite, said furnish containing said harsh fibers in amount representing 30-60% of the total fiber weight, subjecting the fiber furnish to a defiberizing treatment in a beater cycle, adding to the furnish toward the end of the beater cycle a polyvinyl resin binder and agitating the fiber-binder furnish to coagulate the polyvinyl resin and to effect deposition thereof as coating films for the individual fibers, diluting the furnish with water to a consistency of less than 1% solids, and sheeting out the furnish and dewatering it to form a felted sheet.

8. A tough and flexible porous sheet comprising a water-laid felt of soft paper-grade chrysotile and harsh non-paper-grade asbestos fibers belonging to the group consisting of harsh chrysotile an tremolite, a polyvinyl resin binder in amount not exceeding 10% by weight of the sheet, and a small amount of bentonite clay adhering to the resin binder, 30-60% by weight of the total fiber present in the sheet comprising the harsh non-paper-grade fibers distributed uniformly in random lay therethrough.

ROBERT G. QUINN.
JOSEPH C. HARKNESS.

REFERENCES CITED

The following references are of record in the file of this patent:

UNITED STATES PATENTS

| Number | Name | Date |
|---|---|---|
| 1,827,701 | Krischbraun | Oct. 13, 1931 |
| 1,971,162 | Novak | Aug. 21, 1934 |
| 2,011,915 | Seigle | Aug. 20, 1935 |
| 2,033,929 | Driscoll | Mar. 17, 1936 |
| 2,080,285 | MacIldowie | May 11, 1937 |
| 2,132,702 | Simpson | Oct. 11, 1938 |
| 2,133,693 | Greider | Oct. 18, 1938 |
| 2,140,195 | Batcheller | Dec. 13, 1938 |
| 2,183,811 | Ho ar | Dec. 19, 1939 |
| 2,251,296 | Shipp | Aug. 5, 1941 |

FOREIGN PATENTS

| Number | Country | Date |
|---|---|---|
| 363,425 | Great Britain | Dec. 24, 1931 |
| 363,716 | Great Britain | Dec. 23, 1931 |
| 488,394 | Great Britain | July 6, 1938 |
| 511,865 | Great Britain | Aug. 25, 1939 |

Certificate of Correction

Patent No. 2,485,458 October 18, 1949

ROBERT G. QUINN ET AL.

It is hereby certified that errors appear in the printed specification of the above numbered patent requiring correction as follows:

Column 3, line 62, for the word "substantially" read *substantial*; column 5, line 70, for "binder is" read *binder as*; column 8, line 2, for "an tremolite" read *and tremolite*;

and that the said Letters Patent should be read with these corrections therein that the same may conform to the record of the case in the Patent Office.

Signed and sealed this 21st day of February, A. D. 1950.

[SEAL]

THOMAS F. MURPHY,
*Assistant Commissioner of Patents.*